(12) United States Patent
Grieve

(10) Patent No.: US 7,743,861 B2
(45) Date of Patent: Jun. 29, 2010

(54) HYBRID SOLID OXIDE FUEL CELL AND GAS TURBINE ELECTRIC GENERATING SYSTEM USING LIQUID OXYGEN

(75) Inventor: Malcolm James Grieve, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 153 days.

(21) Appl. No.: 11/327,079

(22) Filed: Jan. 6, 2006

(65) Prior Publication Data

US 2007/0163822 A1    Jul. 19, 2007

(51) Int. Cl.
*B60W 20/00* (2006.01)
(52) U.S. Cl. .................................. 180/65.31; 903/908
(58) Field of Classification Search .................... 429/13, 429/17, 23, 26; 180/65.3
See application file for complete search history.

(56) References Cited

U.S. PATENT DOCUMENTS

| | | | | |
|---|---|---|---|---|
| 3,301,709 A * | 1/1967 | Lindstrom | ................. | 429/17 |
| 3,404,529 A * | 10/1968 | Lagerstrom | ................. | 60/802 |
| 4,622,275 A * | 11/1986 | Noguchi et al. | ............... | 429/19 |
| 5,083,425 A * | 1/1992 | Hendriks et al. | ......... | 60/39.183 |
| 5,221,586 A * | 6/1993 | Morimoto et al. | ............. | 429/20 |
| 5,319,925 A * | 6/1994 | Hendriks et al. | ......... | 60/39.183 |
| 5,968,680 A * | 10/1999 | Wolfe et al. | .................... | 429/13 |
| 6,551,732 B1 * | 4/2003 | Xu | ............................... | 429/17 |
| 6,607,854 B1 * | 8/2003 | Rehg et al. | ..................... | 429/13 |
| 6,878,362 B2 * | 4/2005 | Kumar et al. | ............... | 423/651 |
| 7,118,818 B2 * | 10/2006 | Agnew et al. | ................. | 429/17 |
| 7,150,143 B2 * | 12/2006 | Schick et al. | .............. | 60/39.38 |
| 7,184,875 B2 * | 2/2007 | Ferrall et al. | .................. | 701/101 |
| 7,306,871 B2 * | 12/2007 | Grieve et al. | .................. | 429/34 |
| 2005/0106429 A1 * | 5/2005 | Keefer | ......................... | 429/20 |
| 2005/0271914 A1 * | 12/2005 | Farooque et al. | ............. | 429/19 |
| 2006/0010866 A1 * | 1/2006 | Rehg et al. | .................. | 60/641.8 |
| 2006/0014064 A1 * | 1/2006 | Ogino et al. | ................... | 429/26 |
| 2007/0166580 A1 * | 7/2007 | Kim et al. | ..................... | 429/20 |
| 2007/0231635 A1 * | 10/2007 | Venkataraman et al. | ....... | 429/20 |
| 2007/0287046 A1 * | 12/2007 | Koda et al. | .................... | 429/26 |
| 2008/0001038 A1 * | 1/2008 | Daggett | .................... | 244/53 R |
| 2008/0003472 A1 * | 1/2008 | Miyamoto et al. | ............ | 429/19 |

* cited by examiner

*Primary Examiner*—Jeffrey J Restifo
(74) *Attorney, Agent, or Firm*—Thomas N. Twomey

(57) ABSTRACT

A hybrid SOFC/gas turbine electric generating system comprising an SOFC stack, a hydrocarbon reformer, a first anode tailgas hydrogen-rich combustor to drive a first gas turbine stage, and a second stoichiometric combustor to drive a second gas turbine stage to drive a generator. Anode tailgas is also recycled into the reformer for substantially endothermic reforming of hydrocarbon fuel. Oxidant is provided as pure oxygen—which may be stored as liquid oxygen. All nitrogen may be excluded. Cathode exhaust is passed to the first combustor, to the second combustor, and is recycled into the cathodes. The turbine exhaust is passed through successive heat exchangers cooled by liquid oxygen being vaporized, precipitating water and solid $CO_2$. The system is operated at about 800 kPa (about 8 atmospheres), thereby increasing the power output of the stack. The system may be operated with no gaseous exhaust or with by-products of water and $CO_2$.

27 Claims, 2 Drawing Sheets

FIG. 2

| | |
|---|---|
| Fuel | Dodecane (equivalent of zero sulfur JP8) |
| Oxidant | Liquid Oxygen |
| | |
| Reformer input: | |
| Fuel | 0.162 g/s |
| Air | 0.000 g/s |
| Recycle | 93% of anode tailgas |
| | |
| Oxygen input system | 0.559 g/s |
| Oxygen input stack | 9.247 g/s |
| Cathode recycle | 98.9% of cathode tailgas |
| | |
| Reformate: | 8.423 g/s |
| Reformate massflow | 700 oC |
| Temperature | 2.364 |
| Composition: | |
| $H_2$ | 20.3% by vol. |
| $H_2O$ | 31.6% by vol. |
| CO | 14.0% by vol. |
| $CO_2$ | 34.1% by vol. |
| $N_2$ | 0.0% by vol. |
| | |
| Stack exit temperature | 850 oC |
| System Pressure | 800 kPa |
| | |
| Stack Power | 5.28 kW |
| Turbine/Generator Power | 0.54 kW |
| System Power | 5.82 kW |
| Gross efficiency (Power/LHV) | 81.4% |
| | |
| Fuel utilization | 25.00% |
| Air Utilization | 5.00% |
| | |
| Combustor phi | 1.000 |
| Final exhaust: | |
| Exhaust massflow | 0.719 g/s |
| Composition: | |
| $H_2O$ | 51.9% by vol. |
| $CO_2$ | 48.1% by vol. |

HYBRID SOLID OXIDE FUEL CELL AND GAS TURBINE ELECTRIC GENERATING SYSTEM USING LIQUID OXYGEN

TECHNICAL FIELD

The present invention relates to solid oxide fuel cell systems; more particularly, to oxidants for solid oxide fuel cell systems; and most particularly, to a hybrid solid oxide fuel cell and gas turbine electric generating system utilizing pure oxygen as the oxidant.

BACKGROUND OF THE INVENTION

Solid oxide fuel cell (SOFC) systems are well known. A typical prior art SOFC system uses reformed hydrocarbon fuels and air to generate electricity, syngas, and heat. Syngas is defined as the tail gas from the stack anodes, which is relatively rich in hydrogen ($H_2$) and water.

The only component in air that is useful for the electrochemical reaction within the fuel cell is oxygen, which comprises about 20%. The majority component in air is nitrogen ($N_2$) which comprises about 80%. Nitrogen represents a large volume of inert gas which must be compressed and heated along with the oxygen when air is provided to the reformer for reforming the hydrocarbon fuel and to the SOFC stack for electrochemical reaction with hydrogen.

It is further known to couple an SOFC system to a gas turbine system in a hybrid configuration for generating electricity wherein the effluents from the SOFC are mixed and expanded in a gas turbine to produce additional electricity. Such a hybrid system has the potential to be an extremely high efficiency system.

Prior art SOFC stacks typically are air cooled. Excess air, well beyond the requirement for electrochemical operation, is used to remove heat generated in the stack. The volume of nitrogen present in an air-supplied SOFC system is useful in helping to cool the stack and manage stack temperatures.

Operating a system with high rates of anode tail gas recycled into either the reformer or into the anode inlet allows lower cathode air flow rates and flatter stack temperature profiles, thus improving power density and system efficiency. Such operation also serves to raise the temperature of the stack post-combustor, thus allowing better matching with the inlet temperature requirements of a gas turbine.

Prior art hybrid SOFC/gas turbine systems are not well-suited to some specialized applications. For example, in marine uses such as in manned or unmanned undersea vehicles, aircraft, or in space craft, the presence of NOx in the exhaust is especially undesirable, as may be a gaseous exhaust of any kind in, for example, clandestine undersea operations. Further, for such vehicles, the potential length of submersion or space travel may be governed by the volumes of fuel and oxidant that can be carried.

What is needed in the art is a hybrid SOFC/gas turbine system that produces no nitrogen or oxides of nitrogen in the exhaust.

What is further needed in the art is a hybrid SOFC/gas turbine system that produces a highly concentrated stream of carbon dioxide ($CO_2$).

What is still further needed in the art is a hybrid SOFC/gas turbine system that produces no gaseous exhaust.

What is still further needed in the art is a fuel cell electric generating system that performs for an extended length of operation on a single fueling of oxidant and hydrocarbon fuel.

It is a principal object of the present invention to generate electricity in a fuel cell system without producing nitrogen or oxides of nitrogen in the exhaust.

It is a further object of the invention to provide such a system wherein the exhaust comprises only water and $CO_2$.

It is a still further object of the invention to provide such a system that performs for an extended length of operation on a single fueling of oxidant and hydrocarbon fuel.

SUMMARY OF THE INVENTION

Briefly described, a hybrid SOFC/gas turbine electric generating system in accordance with the invention comprises an SOFC stack; a hydrocarbon reformer for providing reformate to the stack anodes to generate a first electric output; a first anode tailgas hydrogen-rich combustor for partially burning a first portion of the anode tailgas to drive a first gas turbine stage; and a second stoichiometric combustor for burning the tailgas from the first gas turbine stage to drive a second gas turbine stage. The first and second gas turbine stages together drive a generator for generating a second electric output. A second anode tailgas portion is recycled into the reformer inlet to permit endothermic reforming of the hydrocarbon fuel.

Oxidant for the fuel cell cathodes is provided as pure gaseous oxygen which preferably is stored within the system cryogenically as liquid oxygen (LOx). No air is admitted to the system, so all nitrogen is excluded. A first portion of the cathode exhaust is passed to the first combustor; a second portion of the cathode exhaust is passed to the second combustor; and a third portion of the cathode exhaust is recycled into the cathodes, such that only replacement oxygen is required for the cathodes, equal to the oxygen consumption rate of the stack and combustors.

Preferably, the first and second turbine exhausts are passed together through successive heat exchangers, which may be cooled by liquid oxygen being vaporized for admission to the SOFC stack. Preferably, one heat exchanger is tempered to precipitate water from the exhaust, and a second heat exchanger is tempered to precipitate solid $CO_2$ from the exhaust, when desired.

The system is preferably operated at an internal pressure of about 800 kPa (about 8 atmospheres), thus increasing the partial pressure of oxygen on the cathodes 40-fold over the 20 kPa provided by air at atmospheric pressure in the prior art, thereby increasing substantially the power output and/or efficiency of the stack.

Because the only exhaust products of the system are water and $CO_2$, both of which may be condensed, the system may be operated in a closed volume with no gaseous exhaust. For applications, such as stationary power systems, where gaseous $CO_2$ is desired as a by-product (for sequestration), the step of precipitating solid $CO_2$ from the exhaust may be omitted.

A hybrid system in accordance with the invention is well-suited to use as an auxiliary electric power unit in vehicles such as, but not limited to, manned and unmanned undersea vessels, surface marine vessels, land automotive vehicles, aircraft, and aerospace vehicles.

BRIEF DESCRIPTION OF THE DRAWINGS

The present invention will now be described, by way of example, with reference to the accompanying drawings, in which:

FIG. 2 is a table showing operating parameters and conditions for a typical hybrid system in accordance with the invention.

DESCRIPTION OF THE PREFERRED EMBODIMENTS

Figure 1:
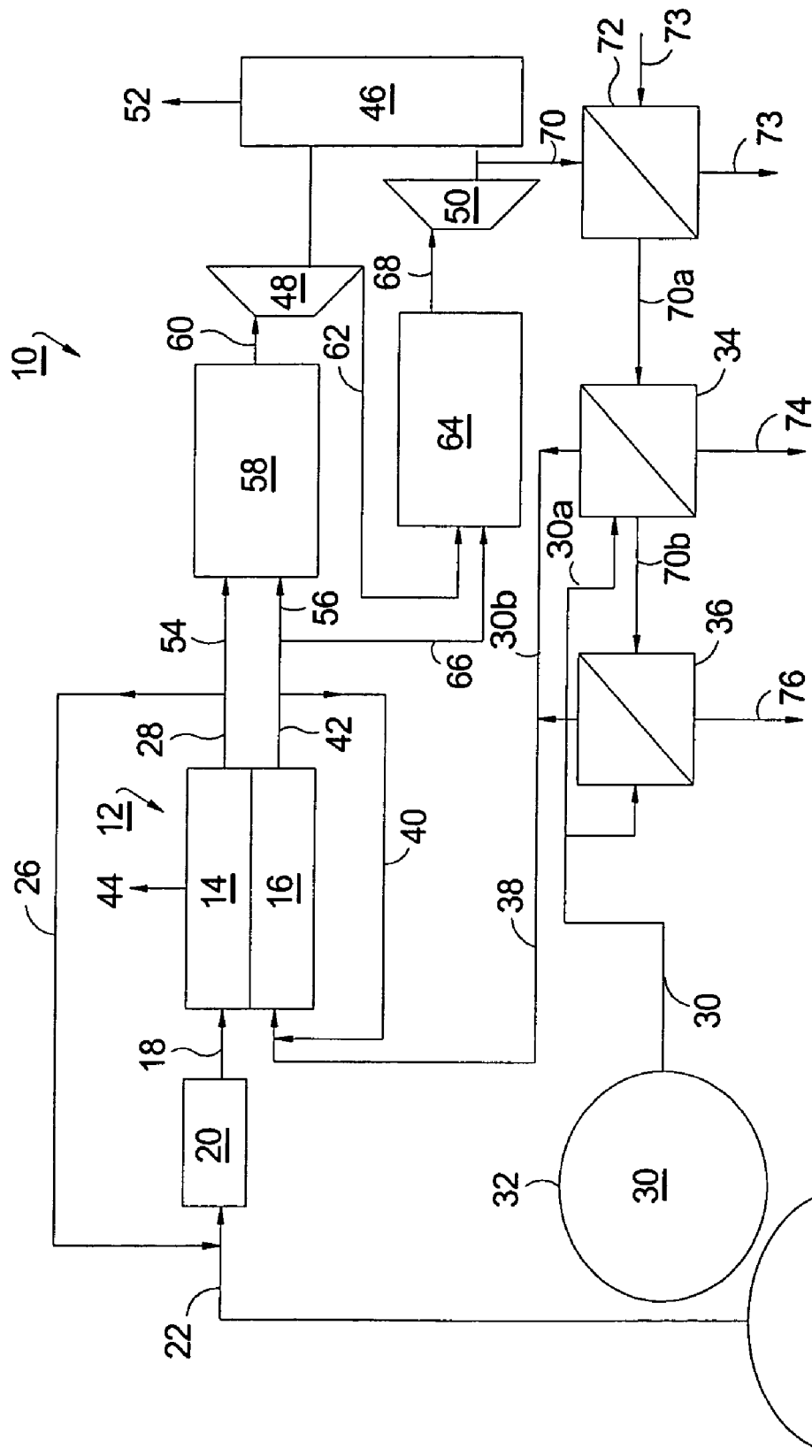
FIG. 1 is a schematic drawing of a hybrid SOFC/gas turbine electric generating system in accordance with the invention.

Referring to FIGS. 1 and 2, a hybrid SOFC/gas turbine electric generating system 10 in accordance with the invention comprises an SOFC stack 12 including a plurality of anodes 14 and a plurality of cathodes 16 in known fashion. Anodes 14 are supplied with hydrogen-rich reformate 18 from a reformer such as, for example, catalytic hydrocarbon reformer 20 that is supplied with hydrocarbon fuel 22 from a reservoir 24 and with a recycled portion 26 of anode tail gas 28. Reforming within reformer 20 is endothermic, relying on water and $CO_2$ in portion 26 as sources of oxygen in known fashion. For temperature control (and for example, for start-up) elemental oxygen may also be supplied to the reformer (not shown). Fuel 22 may be any conventional hydrocarbon, alcohol or hydrogen carrier. Fuel 22 is preferably selected from the group consisting of gasoline, diesel fuel, natural gas, methane, liquefied petroleum gas, naphtha, kerosene, Jet A and similar military fuels (such as JP8 or JP10), methanol and ethanol, as shown in FIG. 2.

Liquid oxygen 30 is stored at or below its boiling point (−183° C.) in a cryogenic tank 32 for supplying gaseous oxygen to cathodes 16. LOx 30 dispensed from tank 32 is passed through first and second heat exchangers 34,36, as described further below, wherein the oxygen acts as a coolant. In the process, LOx 30 is vaporized to gaseous oxygen 38 and is regulated in pressure to preferably about 800 kPa which defines the overall operating pressure of system 10. Depending on the storage pressure of the liquid oxygen, it may be possible to meter the oxidant without a pump, thus minimizing electrical parasitics. If lower pressure storage is used, liquid oxygen could be delivered by a pump (not shown) with high efficiency, much higher than would be possible with compression of air or gaseous oxygen. Note that reformate 18 must be supplied to anodes 14 at substantially the same pressure to avoid untenable anode-to-cathode pressure differences within stack 12. Note also that the partial pressure of hydrogen and carbon monoxide at the anodes is thereby increased approximately 8-fold over a prior art stack operating at atmospheric pressure. All other pressures of oxygen and reformate within system 10, as may be selected for individual applications, are fully comprehended by the invention.

A first portion 40 of cathode tail gas 42 is recycled into the inlet of cathode 16 wherein it is mixed with makeup oxygen 38. Because the operating temperature of an SOFC stack being fueled by pure oxygen is significantly higher than a similar stack being fueled by air, and because the percentage of cathode recycle portion 40 is very high (98.9%, as shown in FIG. 2), the makeup oxygen 38 typically requires little or no preheating.

Within stack 12, hydrogen, carbon monoxide, and oxygen are reacted electrochemically in known fashion to produce a first electric output 44 of system 10.

Hybrid system 10 further comprises a generator system including generator 46 driven by first and second gas turbine stages 48,50 to generate a second electric output 52 of system 10. Reformer 20 and stack 12 are operated such that anode tail gas 28 is relatively rich in residual hydrogen and carbon monoxide; such anode tail gas is a depleted form of what is known in the art as "syngas". A second portion 54 of anode tail gas 28 and a second portion 56 of cathode tail gas 42 are supplied to a "rich" combustor 58, the gaseous output 60 of which drives first stage turbine 48. Spent exhaust gas 62 from combustor 58 and turbine 48 contains residual fuel value and is sent to a second combustor 64 which is operated stoichiometrically with a third portion 66 of cathode tail gas 42. The gaseous output 68 of second combustor 64 drives second stage turbine 50. Preferably, turbine stages 48,50 are stages of a ceramic microturbine. Providing independent first and second stage combustors 58,64 is useful in controlling peak temperatures within the turbine.

Turbine tail gas 70 from turbine 50, comprising only water, carbon dioxide, and heat, may be exhausted directly to atmosphere if so desired. Preferably, gas 70 is directed through a third heat exchanger 72, which may be cooled by, for example, sea water 73 to reduce the heat of gas 70a to a temperature close to the dew point of the gas, which is then passed sequentially through first and second heat exchangers 34,36. Referring to FIG. 2, it is seen that the final exhaust (gas 70,70a) comprises only gaseous water (51.9 volume percent) and gaseous carbon dioxide (48.1 volume percent). The flow rate and temperature of the exhaust gas, as well as the flow rate of cold oxygen 30/38 and the size of exchangers 34,36 are selected such that essentially all of the water is condensed out of gas 70b in first exchanger 34 as liquid water 74, and such that essentially all of the $CO_2$ is precipitated from the exhaust gas in second exchanger 36, as solid $CO_2$ (dry ice) 76 by the heat of vaporization of the liquid oxygen. Through this heat exchange process, liquid oxygen 30 is converted to cold vaporized oxygen 30a before proceeding, as gaseous oxygen 30b/38, to cathodes 16. Thus, in this mode of operation of system 10, the system is closed and there is no gaseous exhaust passed outside the system. Provision is easily made to accumulate the condensed water and precipitated dry ice within the system and to remove them at the next refueling of the system.

Other uses can be envisioned for a system in accordance with the invention wherein, for example, the stream of pure carbon dioxide may be useful in an application such as, for example, cooling functions on a vehicle including refrigeration and air conditioning, in which case second exchanger 36 may be omitted, within the scope of the invention.

Several significant advantages flow from using liquid oxygen as the oxidant in a system in accordance with the invention, including:

- The voltage efficiency and power density are greatly increased over air-powered SOFC stacks because of the large increase in pressure of oxygen and reformate in the stack.
- There are little or no parasitic losses for compression of air to feed the cathodes and cool the stack.
- There is no nitrogen dilution in the final exhaust, thus reducing very substantially the size of heat exchangers required to accommodate the final exhaust, avoiding the formation of oxides of nitrogen and allowing a concentrated stream of water and $CO_2$ to be produced.
- And, of course, onboard oxidant storage is very compact, providing for very extended, self-sufficient operation of the system between refillings of hydrocarbon fuel and liquid oxygen.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for generating electricity, comprising:
   a) a hydrocarbon reformer for producing reformate from hydrocarbon fuel;
   b) a fuel cell stack having anodes and cathodes for consuming said reformate to produce a first electric output, an anode tail gas, and a cathode tail gas;
   c) a source for providing oxygen as an oxidant for said system;
   d) a combustor for combusting at least a first portion of said anode tail gas with oxygen to produce a combustor tail gas, said combustor comprising a first combustor for combusting at least a portion of said first portion of said anode tail gas with oxygen to form a first combustor tail gas; and
   e) an electrical generator system for receiving said combustor tail gas to produce a second electric output and a generator tail gas containing water and carbon dioxide, said electrical generating system comprising a first stage gas turbine for receiving said first combustor tail gas and for generating a first stage turbine tail gas. and a second combustor for combusting said first stage turbine tail gas with additional oxygen to form a second combustor tail gas.

2. A system in accordance with claim 1 further comprising a condenser for condensing said water from said generator tail gas.

3. A system in accordance with claim 1 wherein said source for providing oxygen is a source of liquid oxygen and further comprising a vaporizer for vaporizing said liquid oxygen.

4. A system in accordance with claim 1 further comprising a condenser for precipitating said carbon dioxide from said generator tail gas.

5. A system in accordance with claim 1 wherein said source for providing oxygen includes a storage tank.

6. A system in accordance with claim 1 wherein a second portion of said anode tail gas is recycled into said hydrocarbon reformer.

7. A system in accordance with claim 1 wherein a First portion of said cathode tail gas is recycled into said cathodes.

8. A system in accordance with claim 1 wherein said electrical generator system further includes a second stage gas turbine for receiving said second combustor tail gas and for generating a second stage turbine tail gas.

9. A system for generating electricity, comprising:
   a) a hydrocarbon reformer for producing reformate from hydrocarbon fuel;
   b) a fuel cell stack having anodes and cathodes for consuming said reformate to produce a first electric output, an anode tail gas, and a cathode tail gas;
   c) a source of liquid oxygen and a vaporizer for vaporizing said liquid oxygen to provide gaseous oxygen as an oxidant for said system;
   d) a combustor for combusting at least a first portion of said anode tail gas with oxygen to produce a combustor tail gas, said combustor comprising a first combustor for combusting at least a portion of said first portion of said anode tail gas with oxygen to form a first combustor tail gas;
   e) an electrical generator system for receiving said combustor tail gas to produce a second electric output and a generator tail gas containing water and carbon dioxide, said electrical generating system comprising a first stage gas turbine for receiving said first combustor tail gas and for generating a first stage turbine tail gas, and a second combustor for combusting said first stage turbine tail gas with additional oxygen to form a second combustor tail gas; and
   f) means for recycling and combining said cathode tail gas with said gaseous oxygen as said oxidant for said system.

10. A system in accordance with claim 9 further comprising a primary heat exchanger for cooling said generator tail gas.

11. A system in accordance with claim 10 further comprising at least one secondary heat exchanger for sequentially receiving said generator tail gas.

12. A system in accordance with claim 11 wherein said primary heat exchanger dissipates heat to outside the system and said at least one secondary heat exchanger is cooled with said liquid oxygen, including cooling by absorbing heat by the vaporization of said liquid oxygen.

13. A system in accordance with claim 12 wherein said at least one secondary heat exchanger comprises first and second heat exchangers, wherein said first heat exchanger is adapted to condense liquid water from said generator tail gas and said second heat exchanger is adapted to precipitate solid carbon dioxide from said generator tail gas.

14. A system in accordance with claim 12 wherein said primary heat exchanger is cooled with fresh or salt water or air.

15. A vehicle comprising a system for generating electricity, said system including
   a hydrocarbon reformer for producing reformate from hydrocarbon fuel,
   a fuel cell stack having anodes and cathodes for consuming said reformate to produce a first electric output, an anode tail gas, and a cathode tail gas,
   a source for providing liquid oxygen as an oxidant for said system,
   a vaporizer for vaporizing said liquid oxygen to provide gaseous oxygen to said cathodes,
   means for recycling and combining said cathode tail gas with said gaseous oxygen provided to said cathodes,
   a combustor for combusting at least a first portion of said anode tail gas with oxygen to produce a combustor tail gas, said combustor comprising a first combustor for combusting at least a portion of said first portion of said anode tail gas with oxygen to form a first combustor tail gas, and
   an electrical generator system for receiving said combustor tail gas to produce a second electric output and a generator tail gas containing water and carbon dioxide, said electrical generating system comprising a first stage gas turbine for receiving said first combustor tail gas and for generating a first stage turbine tail gas, and a second combustor for combusting said first stage turbine tail gas with additional oxygen to form a second combustor tail gas.

16. A vehicle in accordance with claim 15 wherein said vehicle is selected from the group consisting of manned undersea vessel, unmanned undersea vessel, surface marine vessel, land automotive vehicle, aircraft, and aerospace vehicle.

17. A vehicle in accordance with claim 15 wherein the vaporization of said liquid oxygen or the sublimation of solid CO2 produced as a byproduct of the system is used for cooling functions on the vehicle.

18. A vehicle in accordance with claim 15 wherein said system for generating electricity further includes a condenser for condensing said water and precipitating said carbon dioxide from said electrical generator tail gas.

19. A system for generating electricity, comprising:
a) a hydrocarbon reformer for producing reformate from hydrocarbon fuel;
b) a fuel cell stack having anodes and cathodes for consuming said reformate to produce a first electric output, an anode tail gas, and a cathode tail gas;
c) a source of liquid oxygen to provide gaseous oxygen as an oxidant for said cathodes;
d) a combustor for combusting at least a first portion of said anode tail gas with oxygen to produce a combustor tail gas, said combustor comprising a first combustor for combusting at least a portion of said first portion of said anode tail gas with oxygen to form a first combustor tail gas;
e) an electrical generator system for receiving said combustor tail gas to produce a second electric output and a generator tail gas containing water and carbon dioxide, said electrical generating system comprising a first stage gas turbine for receiving said first combustor tail gas and for generating a first stage turbine tail gas, and a second combustor for combusting said first stage turbine tail gas with additional oxygen to form a second combustor tail gas; and
f) means for recycling and combining said cathode tail gas with said gaseous oxygen provided to said cathodes, wherein said recycled cathode tail gas comprises about 98 percent of the total combined oxygen provided to said cathodes.

20. A system in accordance with claim 19 further comprising a vaporizer for vaporizing said liquid oxygen into said gaseous oxygen.

21. A system in accordance with claim 20 wherein said vaporizer uses said generator tail gas to vaporize said liquid oxygen into said gaseous oxygen.

22. A system for generating electricity, comprising:
a) a hydrocarbon reformer for producing reformate from hydrocarbon fuel;
b) a fuel cell stack having anodes and cathodes for consuming said reformate to produce a first electric output, an anode tail gas, and a cathode tail gas;
c) a source of liquid oxygen and a vaporizer for vaporizing said liquid oxygen to provide gaseous oxygen as an oxidant for said system;
d) a combustor for combusting at least a first portion of said anode tail gas with oxygen to produce a combustor tail gas, said combustor comprising a first combustor for combusting at least a portion of said first portion of said anode tail gas with oxygen to form a first combustor tail gas;
e) an electrical generator system for receiving said combustor tail gas to produce a second electric output and a generator tail gas containing water and carbon dioxide, said electrical generating system comprising a first stage gas turbine for receiving said first combustor tail gas and for generating a first stage turbine tail gas, and a second combustor for combusting said first stage turbine tail gas with additional oxygen to form a second combustor tail gas;
f) a first heat exchanger adapted to condense liquid water from said generator tail gas; and
g) a second heat exchanger adapted to precipitate solid carbon dioxide from said generator tail gas.

23. A system in accordance with claim 22 wherein said first and second heat exchangers are disposed sequentially.

24. A system in accordance with claim 23 wherein said first heat exchanger is cooled with said liquid oxygen, including cooling by adsorbing heat by the vaporization of said liquid oxygen.

25. A system in accordance with claim 22 further comprising a third heat exchanger for cooling said generator tail gas.

26. A system in accordance with claim 25 wherein said third heat exchanger is disposed upstream of said first and second heat exchangers.

27. A system in accordance with claim 26 wherein said third heat exchanger is cooled with fresh or salt water or air.

* * * * *